Dec. 11, 1934.  W. A. KRAFT  1,984,143
INTERMITTENT FILM MOVING MECHANISM
Filed May 4, 1932
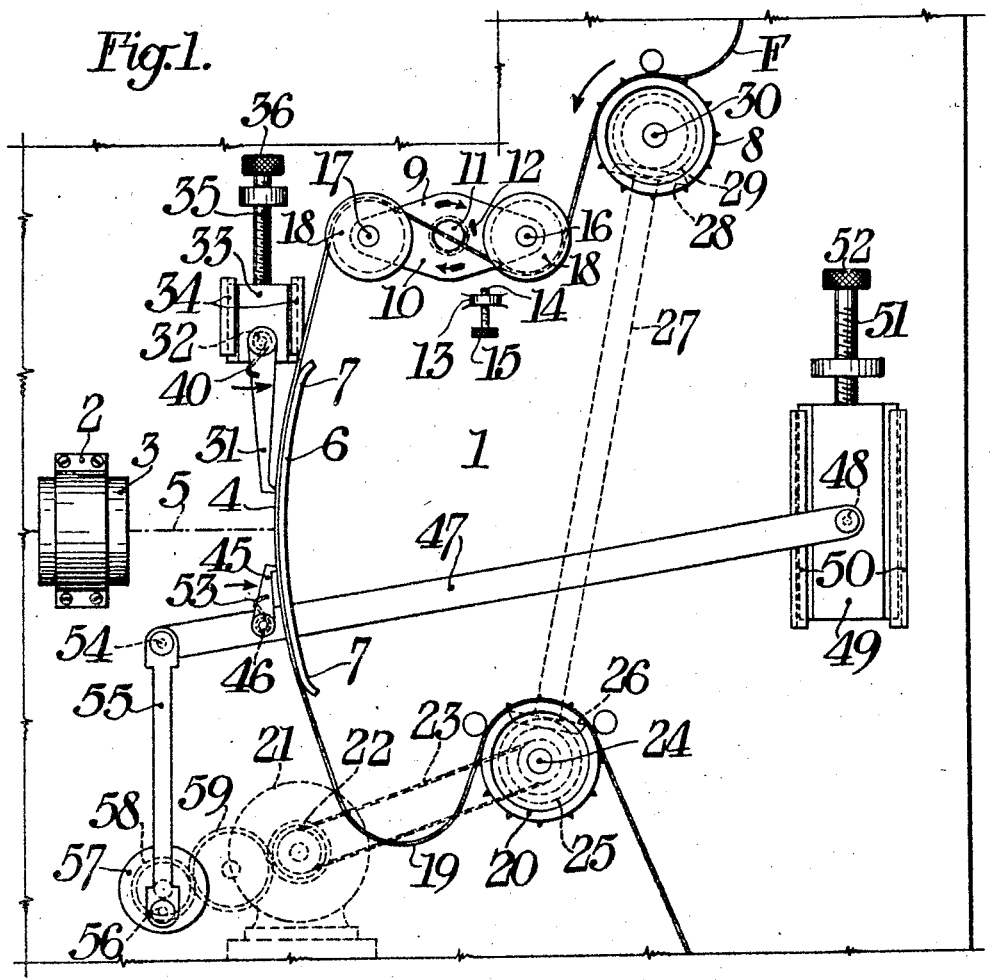
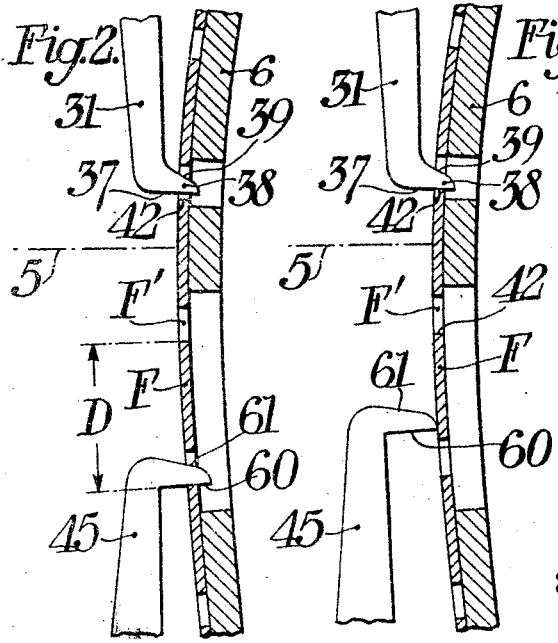
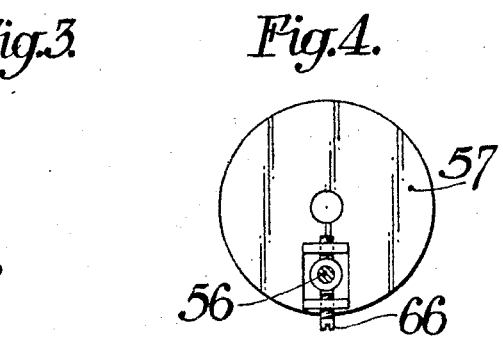
William A. Kraft,
Inventor
By Newton M. Perrins
Donald H. Stewart
Attorneys Patented Dec. 11, 1934

1,984,143

UNITED STATES PATENT OFFICE 1,984,143

INTERMITTENT FILM MOVING MECHANISM

William A. Kraft, Rochester, N. Y., assignor to Eastman Kodak Company, Rochester, N. Y., a corporation of New York Application May 4, 1932, Serial No. 609,150

4 Claims. (Cl. 88—18.4)

This invention relates to photography and more particularly to motion picture photography in which a perforated film band is moved intermittently past a gate. One object of my invention is to provide an intermittent film moving mechanism which can operate at high speed. Another object of my invention is to provide a mechanism which will register the successive frames on a motion picture film with extreme accuracy relative to an objective. Another object of my invention is to provide a film moving mechanism in which the stroke of the pulldown claw need not be of extreme accuracy. Another object of my invention is to provide a motion picture pulldown mechanism with a film locating member against which film is held by means of a tensioning device. Another object of my invention is to provide a motion picture film moving mechanism in which there is a means tending to move the film against the direction in which the film is moved by the pulldown claw. Still another object of my invention is to provide a film moving mechanism which is extremely accurate and which can be readily adjusted, and other objects will appear from the following specification and novel features being particularly pointed out in the claims at the end thereof.

Coming now to the drawing wherein like reference characters denote like parts throughout:

Fig. 1 is a side elevation of a motion picture pulldown mechanism constructed in accordance with and embodying a preferred form of my invention.

Fig. 2 is an enlarged detail fragmentary view through a section of the film gate, the pulldown claw being in operative engagement with the film and the holding claw being out of operative engagement therewith.

Fig. 3 is a view similar to Fig. 2 but with the holding claw in operative engagement with the film and the pulldown claw out of operative engagement therewith, and Fig. 4 is an enlarged fragmentary detail showing an adjustable eccentric for varying the stroke of the pulldown claw.

This motion picture pulldown mechanism may be used in any machine where it is necessary or desirable to intermittently move perforated film past a station. Such machines may be cameras, projectors, printing machines, or the like.

In the embodiment shown in the drawing, a small portion of an intermittent projection printing machine is illustrated by way of example and this machine may consist of a supporting plate 1 which may carry a bracket 2 supporting an objective mounted in the barrel 3. A gate 4 is mounted on the axis 5 of the objective and in the form shown the gate differs from the standard motion picture gate in employing only one arcuate film supporting member 6, this plate having curved ends 7.

It is obvious that the usual 2-piece type of gate may be employed if desired.

The film F may be led over a power driven sprocket 8 and over a tensioning device designated broadly as 9.

This tensioning device may consist of a bracket 10 pivotally mounted by a shaft 11 upon the plate 1. A spring 12 encircling this shaft tends to move the bracket in the direction shown by the arrows, and a lug 13 carried by the plate 1 supports an adjustable stop 14, the knurled head 15 permitting movement of the stop to limit the movement of the bracket 10.

The bracket 10 supports a pair of shafts 16 and 17 on which the usual type of flanged rollers 18 are revolubly supported. The film F is looped about these rollers and is then drawn down over the curved plate 6, being formed into a loop at 19 before being passed over a sprocket 20. This sprocket is also power driven.

The power drive is diagrammatically shown as consisting of a motor 21 having a pulley 22 over which a belt 23 passes, this belt driving the shaft 24 which drives the sprocket 20 and also driving a beveled gear 25 meshing with beveled gear 26 of shaft 27.

Shaft 27 through the mated beveled gears 28 and 29 drives the shaft 30 supporting sprocket 8. Thus, these two sprockets are driven together and at the same speed.

The film, threaded as above described, is held in the proper position by means of a holding claw 31. This holding claw is mounted on a pivot 32 carried by the slide 33 which is adjustable in the tracks 34 carried by the plate 1 by means of a screw 35. The knurled head 36 may be turned to adjust the position of the claw 31 and particularly to adjust the locating edge 37 of the claw tooth 38.

As shown in Figs. 2 and 3, the claw tooth 38 is provided with a beveled edge 39 opposite the locating edge 37. The claw is normally spring pressed toward the film by means of a spring 40 which encircles the pivot 32. This spring creates only a light tension on the holding claw but tends to move it to its operative position as shown in Fig. 3. In this position, the locating edge 37, by engaging an edge 42 of a film aperture F', accurately positions the film relative to the objective axis 5.

It will be obvious that as the film F is passed about the tensioning rollers 18, there is a tendency to draw the film against the locating edge 37 of the holding claw. This is a comparatively light tension, but nevertheless holds the film firmly against the claw.

To move the film against this tension, there is a pulldown claw 45 pivotally supported upon the pin 46, carried by an arm 47, which is pivotally mounted at 48 upon a slide 49 adjustable on the tracks 50 by means of the screw 51, the knurled head of which 52 may be turned to adjust this pivot. Normally, the pivot 48 is preferably arranged on the axis 5 of the objective and substantially radially of the curved plate 6, since this causes the claw to follow the path of the curved plate. The claw 45 is preferably pressed towards the film by means of a spring 53, this spring exerting a light tension on the claw. Arm 47 is pivotally attached at 54 to a pitman 55, pivotally mounted at 56 to a disk 57, which may be power driven from the motor 21, as shown conventionally by the intermeshing gears 58 and 59.

The pivot 56 is eccentrically arranged on the disk 57 a sufficient distance off the center of the disk to move the claw a distance slightly greater than the distance D between two lower edges of the motion picture film perforations F'. The reason for this is as follows. Since the film F tends to move rearwardly under the impulse of the tensioning bracket 10 carrying the rollers 18, the pulldown claw 45 may move the film slightly past the position necessary and the tensioning device upon the film being released will pull the film immediately backwardly against a locating edge 37 of the holding claw. This movement is illustrated in Figs. 2 and 3, Fig. 2 illustrating the lowermost position of the pulldown claw 45 wherein the edge 42 of the film perforation is beyond the edge 37, and Fig. 3 illustrating the position of the film as soon as it is released by the holding claw 45, the film having been moved rearwardly by the tensioning device against the claw 37. Thus the exposure areas are accurately located, even though the stroke of the pulldown claw 45 is not extremely accurate.

The pulldown claw 45 has a straight edge 60 for engaging a film perforation in moving the film, and a beveled edge 61 which permits the claw to ride up against the action of spring 53 during the upward movement of the lever 47. Thus, the claw 45 has a latch-like action, that is, it may ride over the film during its upward movement and the spring 53 will thrust it into engagement with a perforation when the claw reaches its uppermost position.

The holding claw 31 is similar in that the spring 40 exerts a light thrust on the holding claw, tending to hold it against the film so that when a perforation comes opposite the tooth 38, the claw will drop in and hold the film against rearward movement and so that when the pulldown claw is moving the film the beveled edge 39 will cause the claw 31 to ride up on the film until the next perforation comes opposite the tooth 38.

With a pulldown mechanism built as above described, the film may be run at an extremely high speed without sacrificing the accuracy with which the individual film frames are positioned relative to the objective 3. The reason for this is that the pulldown claw is not responsible for the position of the film but is only responsible for moving the film and since there is always a rearward tension on the film, the film is always moved into engagement with a definite locating member which in this case is the holding claw 31. There is an additional advantage in this type of pulldown mechanism in that the film is always held against the curved plate 6 over the exposure area at least by means of the claw 45, since this claw either engages a perforation or rides over the film during its upward movement, holding the film flat against the plate 6 over that area 4 which serves as a gate.

It should also be noticed that this is a very simple type of pulldown mechanism to adjust. In setting up the machine, the holding claw 37 is placed in an aperture with the tensioning bracket 10 positioned substantially as shown in Fig. 1 and the center of the picture frame is placed directly on the axis of objective 3. This may be readily done by moving the knurled screw 36 until the frame is axially arranged. If the claw is moved upwardly, the tensioning device will automatically move the film in the same direction; if moved downwardly, the claw definitely moves the film.

It is then only necessary to adjust the pulldown claw 60 to a lowermost position in which the bottom of the film aperture 42 lies slightly below the locating edge 37 of the pulldown claw. This may be done by turning the knurled head 52.

As shown in Fig. 4, the eccentric 56 can be adjusted on the disk 57 by means of a set screw 66 if desired, although, since the distinction between the various film perforations is standard, such adjustment is not essential.

What I claim is:

1. In a motion picture pulldown for perforated film the combination with a gate, of a pulldown mechanism for moving film forwardly past said gate including a locating tooth resiliently pressed against a film and having an edge adapted to locate the film through contact with an edge of a film perforation, a back tensioning device for the film, a pulldown having a film engaging edge for engaging the same edge of a film perforation as the locating tooth, means for moving the pulldown claw through a path, the location of the film engaging edge of the pulldown at the ends of the path being slightly greater than the distance between one or more film perforations whereby said claw may move a film beyond said locating tooth and said back tensioning device may move the film in a reverse direction against said locating tooth.

2. In a motion picture pulldown for perforated film, the combination with a curved gate plate, of a hingedly mounted spring pressed locating tooth for locating film on the gate, a back tensioning device for moving a film perforation into contact with the tooth, a pulldown claw mounted to move through a fixed path to engage and release a film perforation and adapted to move film against said back tensioning device, whereby a film perforation may be moved past said locating tooth and may be moved back by said tensioning device to the locating tooth.

3. In a motion picture pulldown mechanism for use with perforated motion picture film, the combination with a curved one-piece film gate, of a pulldown mechanism for moving the film past the gate including a locating tooth, a spring pressed arm forcing said tooth into engagement with the film, a pulldown claw for moving the film forwardly, a spring for holding the claw into engagement with the film, the tooth and the claw having parallel surfaces for engaging a film aperture, said surfaces being so spaced that only one may engage a film aperture at a time, means tending to move the film in a rearward direction whereby said film may move until the edge of an aperture engages the locating tooth when the pulldown claw releases said film.

4. In a motion picture pulldown mechanism for use with perforated motion picture film, the combination with a film gate, of pulldown mechanism for moving film forwardly past the gate including a holding tooth adapted to engage a film at the gate, a spring arm carrying said tooth and tending to press said tooth into engagement with said film, a film locating edge on said tooth and means for adjusting said tooth relative to said gate, a pulldown claw spring pressed against a film at said gate, means for moving said claw through a path and means for adjusting the path with respect to said gate, means tending to move film rearwardly, a film engaging edge on said pulldown, the film locating edge on the tooth and the film engaging edge on the claw being adjusted to a spacing slightly greater than the spacing between one or more film perforations whereby said claw may pull a film perforation past said tooth at each actuation thereof and said film may be moved rearwardly by said means tending to move film rearwardly until it contacts with said holding tooth.

WILLIAM A. KRAFT.